United States Patent Office 3,386,884
Patented June 4, 1968

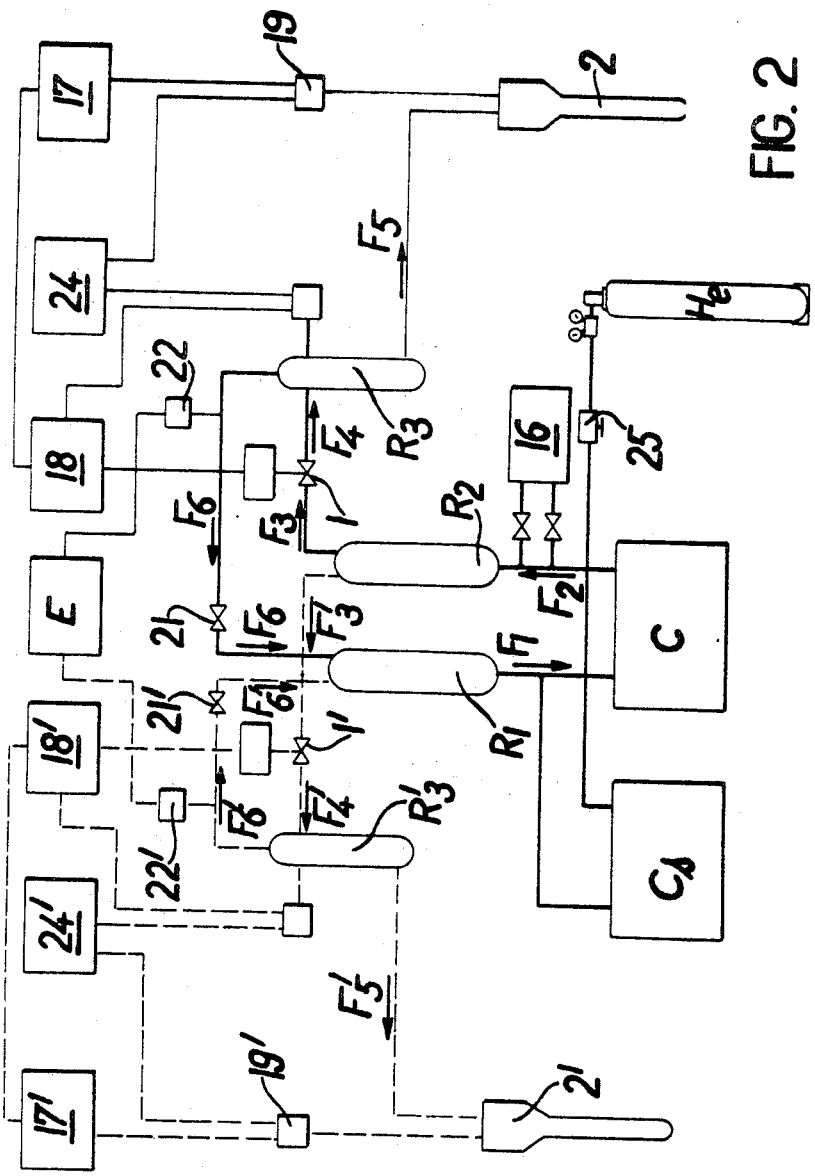

3,386,884
PRESSURE CONTROL
Antoine Bret and Robert Marinot, Aix-en-Provence, France, assignors to Commissariat à l'Energie Atomique, Paris, France
Filed July 22, 1966, Ser. No. 567,248
Claims priority, application France, July 24, 1965, 25,921
8 Claims. (Cl. 176—19)

ABSTRACT OF THE DISCLOSURE

A pressure controlled system for a creep cell has a loading system and a strain gauge measuring the deformations of the test piece. The control system has a first stage having a compressor, a first buffer tank, a second buffer tank and a second stage connected to the second buffer tank, a control valve in the second stage, a tank connected to the creep cell and a return to the compressor intake. A pressure control loop connected to the strain gauge actuates the control valve to hold the pressure in the tank at the required value.

---

Figure 1:
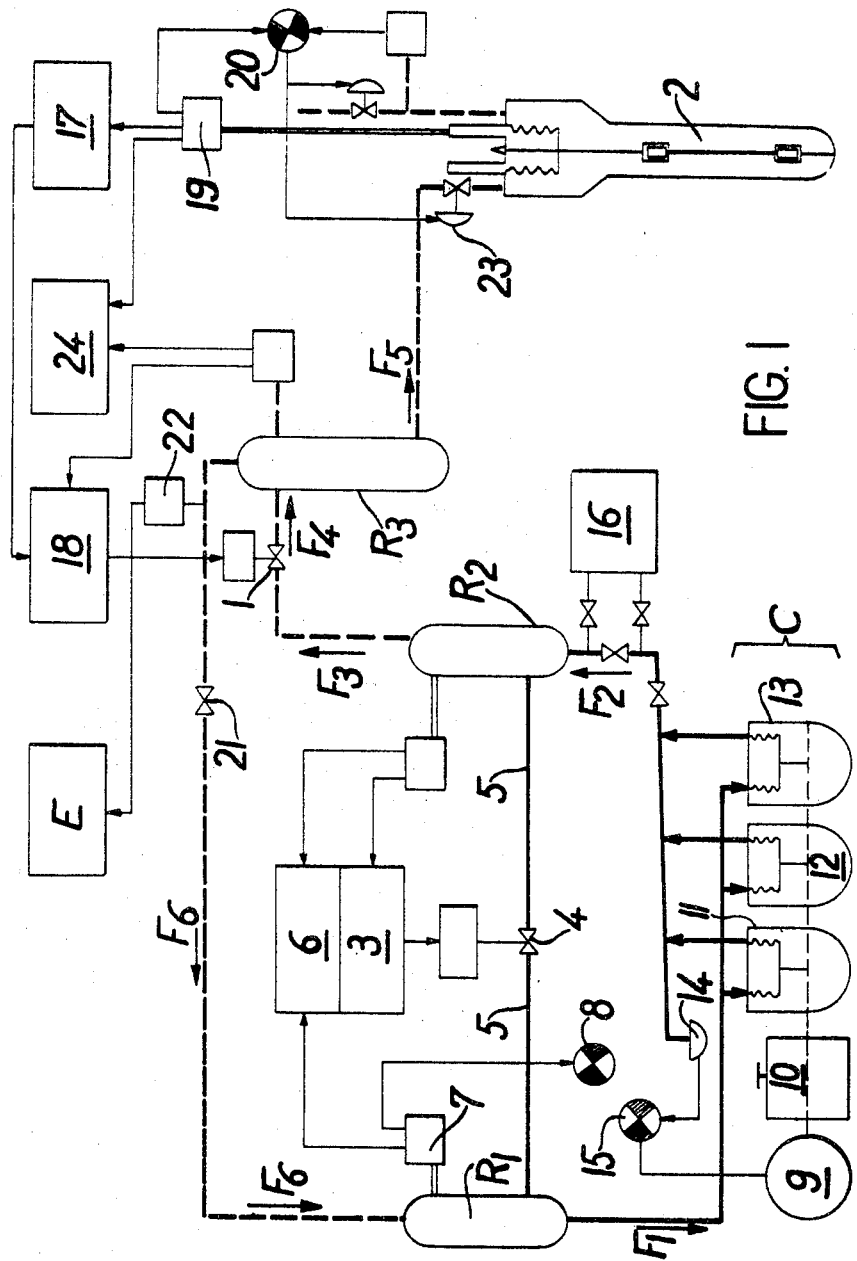

This invention relates to a two-stage pressure control system for fitting to a creep cell comprising a bellows-type pneumatic jack loading system and a strain gauge for continuous measurement of the deformations undergone by the test-piece.

In such a creep cell the test-piece has to be subjected to a constant load at a given temperature during the entire experiment. To satisfy this condition, the gas pressure on the pneumatic jack loading system must develop continuously as a function of the elongation of the test-piece per unit of time to a law which depends more particularly on flexibility variations of the pneumatic jack with the operating temperature in question. In such a creep cell it is also essential that any pulsation of the pressure of the gas acting on the loading system should be avoided. If the creep cell is used in a nuclear reactor, the gas used must be inert with no risk of being activated (e.g. helium). These considerations have led to the adoption of a two-stage pressure control system and compressors of a specific type.

According to the invention there is provided a pressure control system for fitting to a creep cell comprising a bellows type pneumatic jack loading system and strain gauge for continuous measurement of the deformations undergone by the test piece, the said system being characterised in that it comprises firstly, a first stage consisting of a loop formed by a compressor which draws the gas which is intended to act on the pneumatic loading system of the cell from a buffer tank and delivers said gas to a second buffer tank and, secondly, a second stage which receives this gas from the said second buffer tank and comprising a control valve, a tank connected to the creep cell and a return to the compressor intake and a pressure control loop formed by a pressure pick-up connected to the cell strain gauge measuring circuit, by a function generator controlled by said pick-up and by a pressure controller actuated by said generator as a function of the calibration curve of the pneumatic jack loading system for the cell, said controller being intended to actuate the control valve so as to control the pressure in the tank connected to the creep cell at the required value.

The control system according to the invention is particularly advantageous for creep cells (for example containing a uranium test-piece) housed in a nuclear reactor and intended for creep tests under tension.

In nuclear applications the invention is particularly advantageous for simultaneous study of creep inside and outside the reactor using identical test-pieces. In such cases the second stage of the pressure control system comprises two pressure control loops, one for the cell inside the reactor and the other for the control cell outside the reactor.

For operational safety, the first stage of the control system may include an emergency compressor.

In order that the invention may be clearly understood one embodiment of a control system according to the invention will be described with reference to the accompanying drawings in which:

FIGURE 1 is a diagram of a two-stage controller according to the invention corresponding to a simple case in which the creep is to be studied on just one test-piece, and in which just a single compressor is provided, and FIGURE 2 is a simplified diagram showing a case in which creep is simultaneously studied on two identical test-pieces, for example one inside and the other outside a reactor, and in which an emergency compressor is provided.

The pressure control system according to the invention comprises two stages: a first or compression stage, the circuit of which is shown in solid lines in FIG. 1, and a second or control stage, the circuit for which is shown in broken lines in the same figure.

The first or compression stage comprises a compressor, which has been given the general reference C draws helium (arrow F1) from a buffer tank R1 and delivers it (arrow F2) to a second buffer tank R2. The pressure in tank R2 is controlled to a constant value of about 5 bars by a recording controller 3 which actuates a valve 4 in the branch pipe 5 connecting R2 to R1. The pressure in R1 is recorded by a recorder 6. The recordings of the recorders 3 and 6 are on a single strip (two-pen recorder). A minimum/maximum pessure alarm 8 is triggered by a pressure transmitter 7 fixed on R1; valve 4 also has an alarm for maximum opening and closure (not shown).

The compressor C is of the type comprising hydraulically controlled bellows (a solution derived from the conventional flat diaphragm compressor). The compressor comprises a motor 9, a change-speed device 10 and the three bellows-type metering devices 11–13 spaced 120° apart on the driving shaft so as to damp the helium pulsations. It also has a water cooler (not shown) and an oil detector 14 comprising a photo-electric cell and a luminous alarm 15. Any fracture of the bellows 11–13 can be detected by means of the detector. The compressor C finally includes a cyclone-type filter and a sintered metal filter element (not shown) together with a helium purification unit 16 connected in parallel with the delivery pipe.

The second or control stage comprises a circuit in which the helium is fed (arrow F3) from tank R2 through a control valve 1 (arrow F4) to a tank R3 and then to the creep cell 2 (arrow F5).

A function generator 17 is controlled by the pressure pick-up of the strain gauge of the creep cell 2 by means of a pressure transmitter 19 which contains a minimum/maximum pressure alarm 20. The reference point of the pressure controller 18 is determined by the function generator 17 as a function of the displacement pick-up measuring gas pressure and the calibration curve of the pneumatic jack (bellows) loading the creep cell 2. This controller 18 actuates the control valve 1 so as to control the helium pressure in the tank R3 connect to cell 2 to give the required value.

The second or control stage also comprises a leakage valve 21 and a flow transmitter 22 in the pipe connecting (arrow F6) tank R3 to tank R1. This valve 21 is of the manually controlled type (vernier handwheel). Control of 21 is facilitated by the flow recorder E, the flow transmitter 22 of which is connected upstream of 21.

References 23 and 24 respectively denote a safety valve and a pressure recorder.

FIG. 2 is a diagram of a control system according to the invention in which creep is to be studied simultaneously on two identical test-pieces, for example two uranium test-pieces under low stress in a sodium-potassium bath, one in and one outside the reactor.

In such cases identical loads which are constant per unit of time should be maintained on the test-piece of the cell in the reactor and the test-piece of the cell outside the reactor, for which purpose the gas pressure on the pneumatic jack (bellows) loading system for each cell should develop continuously as a function of the elongation of the corresponding test-piece per unit of time to a law which has to be established for each bellows and for the operating temperature in question, since the bellows for the cell in the reactor is not at the same temperature as that of the control cell outside the reactor, because of the nuclear heating in the system in the reactor.

To this end, the control loops for the cell inside the reactor and for the control cell outside the reactor are connected in parallel between the tanks R1 and R2 of the first stage.

These two loops are made to symmetrical circuits containing identical devices which perform the same functions, as shown in simplified form in FIG. 2, in which in the case of the control cell outside the reactor each element of the second stage is denoted by the same reference as the corresponding element of the cell inside the reactor but is followed by a "prime."

The recordings of the flows of fluid of the loop of the reactor cell and of the loop of the cell outside the reactor are made on the same strip by the common flow recorder E which has two pens.

In FIG. 2, an emergency compressor Cs is provided for safety reasons, together with a helium supply pressure reducer 25.

Of course creep cells comprising a pneumatic jack loading system to which the two-stage pressure control system according to the invention is applied are not necessarily intended for creep tests under tension.

We claim:

1. A pressure control system for fitting to a creep cell comprising a bellows-type pneumatic jack loading system and strain gauge for continuous measurement of the deformations undergone by the test-piece, the said system comprising firstly, a first stage consisting of a loop which includes a first buffer tank, a second buffer tank and a compressor which draws the gas which is intended to act on the pneumatic loading system of the cell from the first buffer tank and delivers said gas to the second buffer tank and, secondly, a second stage which receives this gas from the said second buffer tank and comprising a control valve, a tank connected to the creep cell and a return to the compressor intake and a pressure control loop formed by a pressure pick-up connected to the cell strain gauge measuring circuit, by a function generator controlled by said pick-up and by a pressure controller actuated by said generator as a function of the calibration curve of the pneumatic jack loading system for the cell, said controller being intended to actuate the control valve so as to control the pressure in the tank connected to the creep cell at the required value.

2. A pressure control system according to claim 1, applied to simultaneous study of two creep cells having identical test-pieces, wherein the second stage comprises two pressure control loops, i.e. one loop for each of the two cells.

3. A pressure control system according to claim 2, wherein one of the two creep cells is housed in a nuclear reactor and the other creep cell is a control cell outside the reactor.

4. A pressure control system according to claim 3, wherein the creep cell housed in the nuclear reactor is a cell containing a uranium test-piece.

5. A pressure control system according to claim 1, wherein the first stage includes an emergency compressor.

6. A pressure control system according to claim 5, wherein each compressor is of the hydraulically controlled bellows type.

7. A pressure control system according to claim 5, wherein each compressor comprises three bellows-type metering devices spaced 120° apart on the drive shaft.

8. A pressure control system according to claim 1, wherein the gas used is an inert gas.

References Cited

FOREIGN PATENTS 922,339    3/1963    Great Britain.
375,547    4/1964    Switzerland.

OTHER REFERENCES

AECL–1386, August 1961, pp. 1–15.
Journal of Scientific Instruments, vol. 38, July 1961, p. 306.
Transactions of ANS, November 1962, p. 317.

CARL D. QUARFORTH, *Primary Examiner.*

H. E. BEHREND, *Assistant Examiner.*